Jan. 13, 1953 M. J. BERLYN 2,625,141
FUEL INJECTION METHOD
Original Filed Aug. 7, 1948 13 Sheets-Sheet 1

INVENTOR.
MARTIN J. BERLYN
BY Raymond A. Paquin
ATTORNEY.

Jan. 13, 1953     M. J. BERLYN     2,625,141
FUEL INJECTION METHOD

Original Filed Aug. 7, 1948     13 Sheets—Sheet 4

INVENTOR.
MARTIN J. BERLYN
BY Raymond A. Paquin
ATTORNEY.

Jan. 13, 1953  M. J. BERLYN  2,625,141
FUEL INJECTION METHOD

Original Filed Aug. 7, 1948  13 Sheets-Sheet 6

INVENTOR.
MARTIN J. BERLYN
BY Raymond A. Paquin
ATTORNEY.

Jan. 13, 1953 M. J. BERLYN 2,625,141
FUEL INJECTION METHOD
Original Filed Aug. 7, 1948 13 Sheets-Sheet 8

INVENTOR.
MARTIN J. BERLYN
BY Raymond A. Paquin
ATTORNEY.

Jan. 13, 1953     M. J. BERLYN     2,625,141
FUEL INJECTION METHOD

Original Filed Aug. 7, 1948     13 Sheets-Sheet 11

INVENTOR.
MARTIN J. BERLYN
BY Raymond A. Paquin
ATTORNEY.

Jan. 13, 1953        M. J. BERLYN        2,625,141

FUEL INJECTION METHOD

Original Filed Aug. 7, 1948        13 Sheets—Sheet 12

INVENTOR.
MARTIN J. BERLYN
BY
Raymond A. Paquin
ATTORNEY.

Jan. 13, 1953     M. J. BERLYN     2,625,141
FUEL INJECTION METHOD

Original Filed Aug. 7, 1948     13 Sheets-Sheet 13

INVENTOR.
MARTIN J. BERLYN
BY
Raymond A. Paquin
ATTORNEY.

Patented Jan. 13, 1953

2,625,141

UNITED STATES PATENT OFFICE 2,625,141

FUEL INJECTION METHOD

Martin J. Berlyn, Suffield, Conn.

Original application August 7, 1948, Serial No. 43,145. Divided and this application November 2, 1949, Serial No. 125,076

11 Claims. (Cl. 123—25)

This invention relates to internal combustion engines, or the like, and has particular reference to new and improved fuel injection method and apparatus therefor.

This application is a division of my application, Serial Number 43,145, filed August 7, 1948.

An object of the invention is to provide a new and improved fuel injection method and apparatus for internal combustion engines, or the like, which method and apparatus are particularly adapted for use with crude fuels such as low quality liquid fuels and suspensions of finely pulverized solid fuels, such as coal, in liquid vehicles.

Another object of the invention is to provide a fuel injection method and apparatus which will achieve rapid injection and fine division of fuel particles without recourse to high pressures.

Another object of the invention is to provide a fuel injection method and apparatus with which it is possible to achieve a constant pressure combustion cycle and thereby avoid the great cylinder pressures and combustion shock which create such structural and mechanical problems in conventional or contemporary high-output compression-ignition engines working on the constant-volume cycle of combustion.

Another object of the invention is to provide fuel injection apparatus which takes up less space in critical regions of the cylinder head.

Another object of the invention is to provide fuel injection apparatus which avoids all of the mechanical complication and numerous operators previously required with conventional constructions to actuate the fuel valves and controls of engines employing blast-injection systems.

Another object of the invention is to provide a new and improved blast type fuel injection method and apparatus.

Another object of the invention is to provide a new and improved blast type fuel injection method and apparatus and which may be operated using air or steam for the blast and which is particularly well adapted for use with steam and is not subject to trouble from condensation even when starting from cold.

Another object is to provide a fuel injection system of the blast type wherein exhaust heat from the engine may be used for generating blast steam when the engine is running.

Another object is to provide a blast type fuel injection system which, when employed with steam as a blast vapor, there may be achieved the smooth combustion of the air-blast engine without the disadvantage associated with the use of an air compressor.

Another object is to provide a blast type fuel injection system wherein the amount of blast vapor per cycle is independent of engine speed, thus giving the system when applied to variable speed engines, a great advantage over previous blast injection systems.

Another object of the invention is to provide a new and improved methed of injecting solid fuel.

Another object of the invention is to provide a new and improved method of injecting solid fuel in pulverized form.

Another object is to provide a new and improved blast injection method for solid fuel.

Another object is to provide a new and improved fuel injection method and apparatus which may be employed with both compression ignition engines and spark ignition engines with the same advantages.

Another object is to provide a new and improved blast injection method utilizing superheated steam.

Other objects and advantages of the invention will be apparent from the following description taken in connection with the accompanying drawings. Many changes may be made in the details of construction and arrangement of parts shown and described.

Referring to the drawings.

Figure 1:
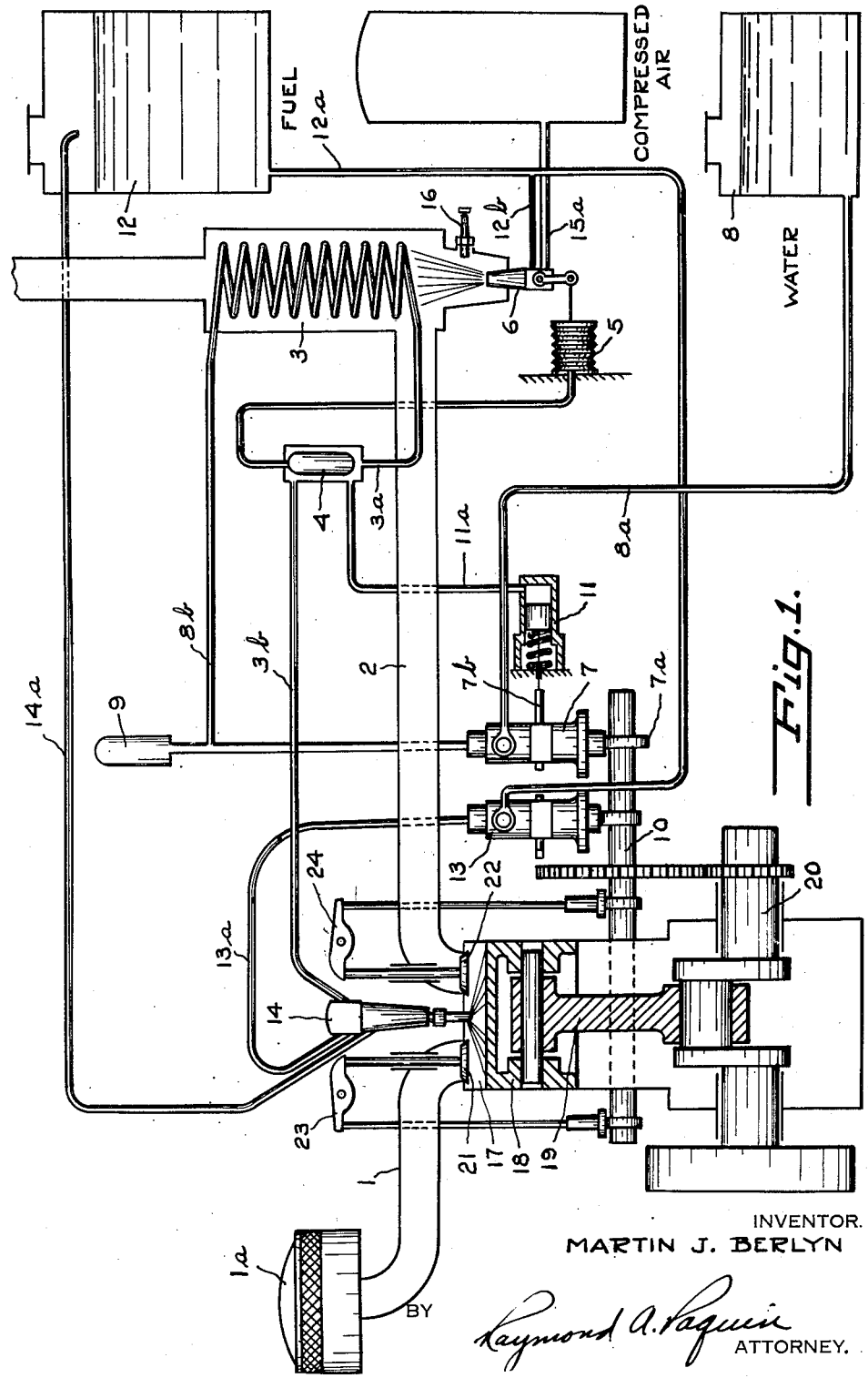
Fig. 1 is a fragmentary diagrammatic view of an engine embodying the invention.
Figures 11, 16:
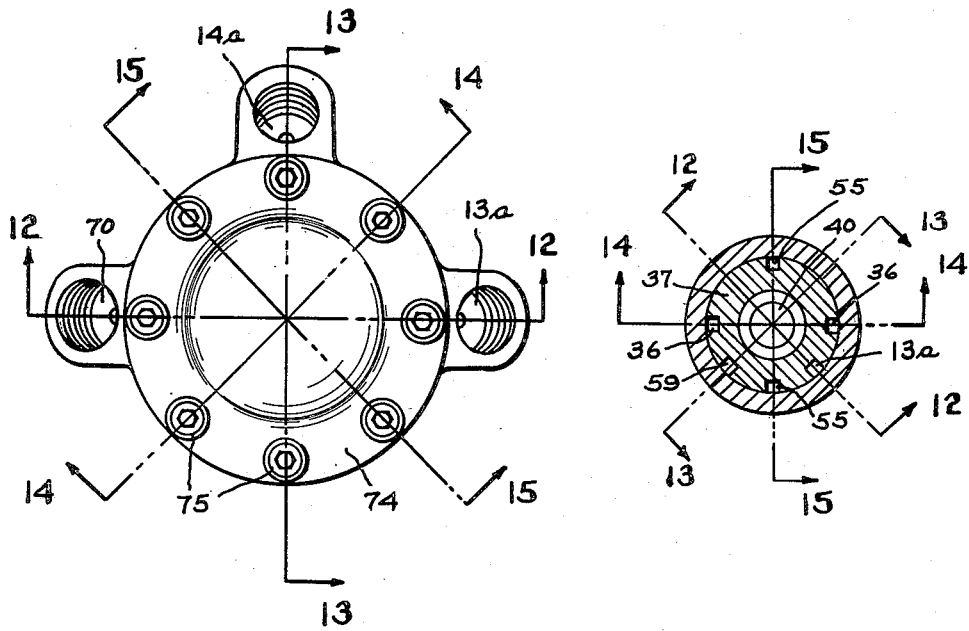
Figures 12, 13:
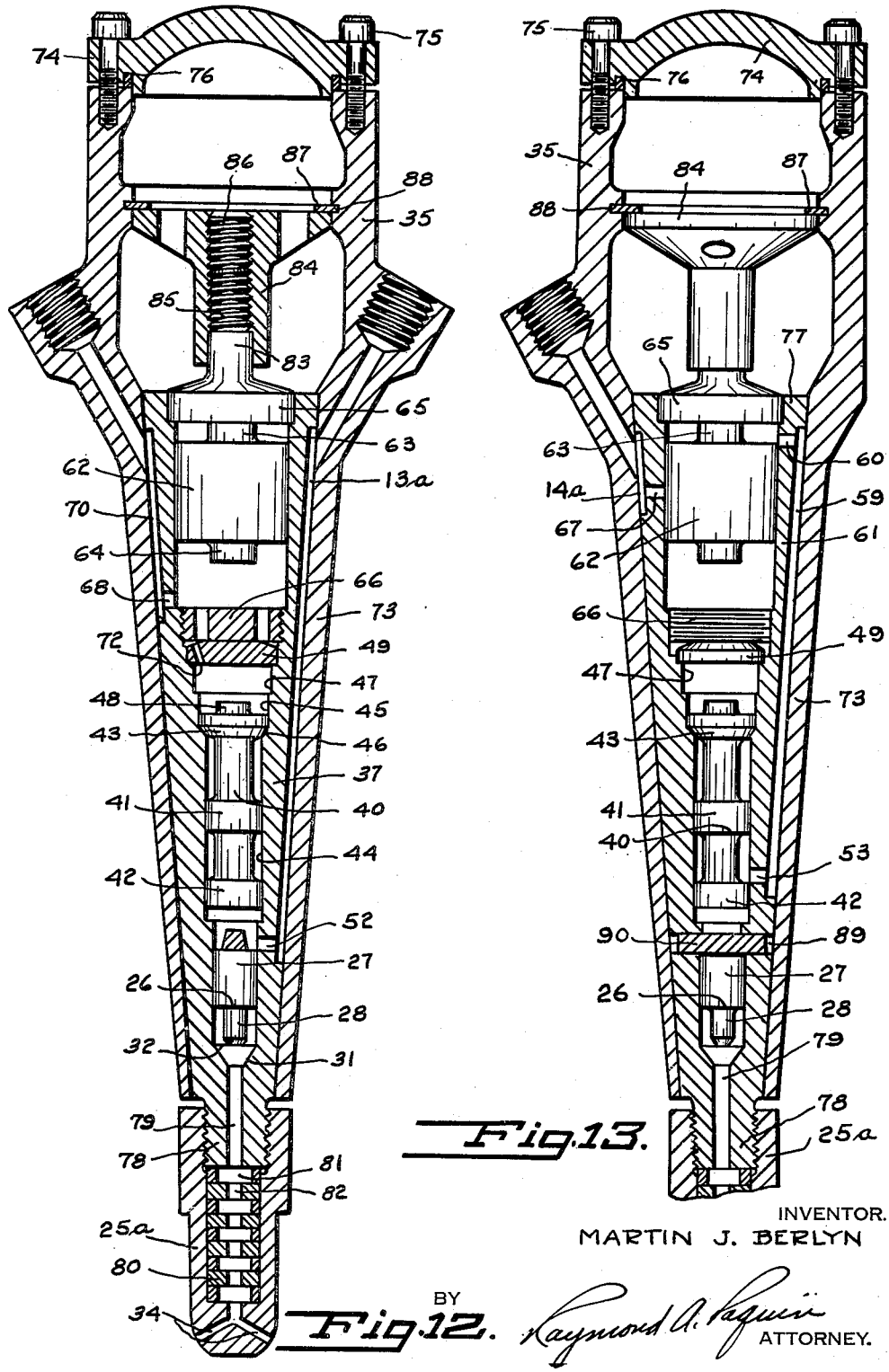
Figures 14, 15:
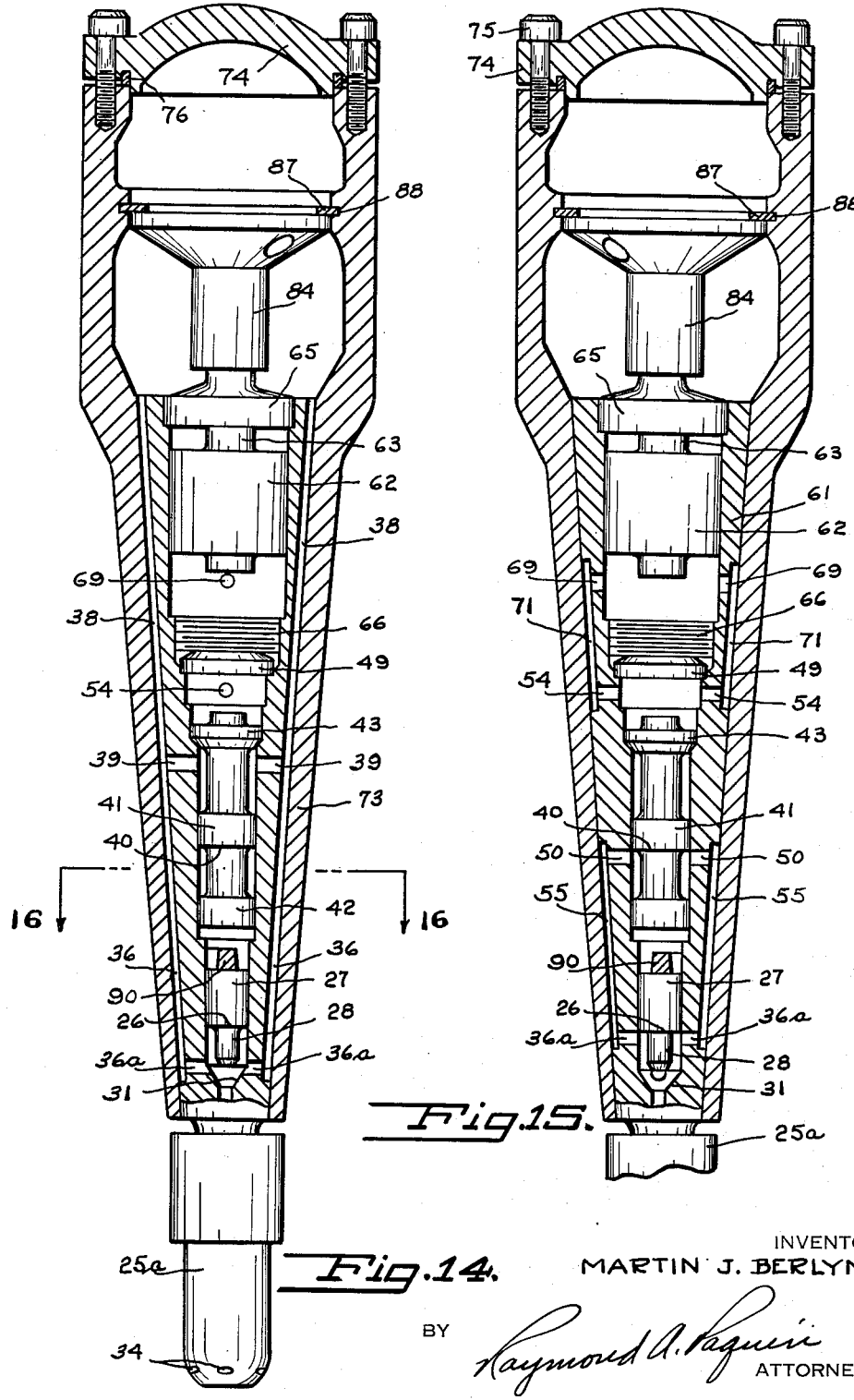

Figs. 3 to 6 inclusive are diagrammatic views of the system shown in Fig. 1 but showing the same at various points in its operation;

Figs. 7 to 10 inclusive are diagrammatic views generally similar to Figs. 2 to 6 inclusive, but illustrating the consequences of failure of various elements of the injection system;

Fig. 11 is a top or plan view of the preferred embodiment of my invention;

Fig. 12 is a sectional view taken on line 12—12 of Fig. 11, looking in the direction of the arrows;

Fig. 13 is a sectional view taken on line 13—13 of Fig. 11, looking in the direction of the arrows;

Fig. 14 is a sectional view taken on line 14—14 of Fig. 11, looking in the direction of the arrows;

Fig. 15 is a sectional view taken on line 15—15 of Fig. 11, looking in the direction of the arrows; and Fig. 16 is a sectional view taken on line 16—16 of Fig. 14, looking in the direction of the arrows.

Referring more particularly to the drawings wherein similar reference characters designate corresponding parts throughout the several views, Fig. 1 is a diagrammatic view showing, by way of example, the application of the present invention to one cylinder of a four-stroke cycle engine. While the application shown is to but a single cylinder of a four-stroke cycle engine, the system is equally applicable to multi-cylinder engines as hereinafter set forth and is also equally applicable to two-stroke cycle engines.

In the arrangement shown in Fig. 1, 1 is the air-intake pipe and 1a the air filter of a conventional four-stroke cycle compression-ignition engine; 2 is the exhaust pipe; 3 is a conventional flash-steam boiler utilizing the exhaust heat from the engine through exhaust pipe 2 to generate high pressure superheated steam and deliver the same through pipes 3a and 3b to injector 14. A temperature-sensitive element 4 cooperates with the bellows or similar device 5 which actuates the control of fuel burner 6 in response to the temperature of the steam leaving flash boiler 3. A boiler feed pump 7 draws water from water tank 8 and pipe line 8a and delivers it under pressure through pipe line 8b to flash boiler 3. A surge-damper 9, of conventional type, is provided in the boiler feed pipe line 8b.

Water pump 7 is actuated by a cam 7a on the engine camshaft 10 and is controlled by means of a pressure-responsive device 11 so that falling steam pressure causes pump 7 to deliver feedwater to flash boiler 3 at a greater rate. The pressure-responsive device 11 is connected by pipe line 11a to the outlet from the flash boiler, such as pipe 3a or pipe 3b. The pressure-responsive device 11 is adapted to adjust pump control rack 7b to which said pressure-responsive device is connected to automatically adjust the supply of water from supply tank 8 to flash boiler 3, at a greater rate as previously described.

Fuel supply tank 12 is connected by pipe lines 12a and 12b to burner 6 and by said pipe line 12a to a conventional type fuel injection pump and governor 13 which is adapted to deliver fuel through line 13a to injector 14, the construction and operation of which is hereinafter described. Pipe 14a is a fuel return or bypass pipe as hereinafter described.

15 is a reservoir of compressed air which is connected by a pipe 15a with burner 6 and 16 is a conventional electric igniter plug that may be energized by a conventional spark coil or ignition transformer.

The engine is provided with the usual combustion chamber or cylinder 17 into which projects injector 14 and in which is mounted the piston 18 which is connected by connecting rod 19 to crankshaft 20. Inlet valve 21 and exhaust valve 22 are adapted to be actuated by rocker levers 23 and 24 respectively and which are both actuated by cams on camshaft 10.

The injector or injection system 14 and various steps in its operation are shown diagrammatically in Figs. 2 to 10 inclusive and the preferred form is shown in Figs. 11 to 16 inclusive. This injector or fuel injection system comprises four main functional units, namely, the injection valve, with which is associated the nozzle, and which is designated generally at A, a steam accumulator designated generally at B, a shuttle valve designated generally at C and a fuel accumulator designated generally at D.

The injection valve A consists of the valve housing 25 which contains the differential valve 26 which is provided with a guide portion 27, of greater diameter than valve face extension 28, and which is also provided on its opposite end with the travel limiting boss 29.

Nozzle 30 is aligned with valve housing 25 and has the seat 31 adapted to be engaged by valve face 32 of valve 26 to control flow through nozzle 30 which is also provided with internal grooves 33 to promote turbulence of flow and orifices 34 of desired number and size to direct the spray of fuel into the combustion chamber of the engine.

Steam accumulator B consists of a housing 35 and communicates with injection valve housing 25 through duct 36 and also communicates with housing 37 and shuttle valve C through duct 38 and port 39.

In shuttle-valve housing 37 is positioned shuttle valve 40, which is free to move axially in said shuttle-valve housing 37. The shuttle valve 40 is provided with two cylindrical lands 41 and 42 and a mushroom-type valve head 43. The lands 41 and 42 are a sliding fit in bore 44 of housing 37 and the valve head 43 is a sliding fit in counterbore 45 of housing 37. Counterbore 45 is of greater diameter than bore 44. The valve head 43 limits travel of the valve 40 in one direction by abutting on seat 46 at the adjacent ends of bore 44 and counterbore 45. Shuttle-valve housing 37 is also provided with another counterbore 47 which is larger in diameter than counterbore 45.

Shuttle valve mushroom head 43 is provided with a boss 48 which limits travel in one direction by abutting against the closure 49 of housing 37.

Housing 37 is provided with ports 39, 50, 51, 52, 53 and 54. Port 39 is always open and communicates by way of duct 38, with steam accumulator 35. Port 50, which may be closed by land 42 of shuttle valve 40, communicates by way of duct 55 with port 56 of injection valve housing 25. Port 51, which is always open, communicates by way of duct 57 with port 58 of injection valve housing 25. Port 52, which is always open, communicates by way of duct 13a with a conventional diesel injection pump 13 of the type which allows some reversal of fuel flow through its discharge port at the end of each injection.

Port 53 is controlled by land 42 of shuttle-valve 40, and it may be opened by either edge of the land 42 or it may be closed by the land 42 and said port 53 communicates by way of duct 59 with port 60 of the fuel accumulator housing 61 which is provided with an axially movable free piston 62 having motion-limiting bosses 63 and 64 on its opposite ends which abut against the closures 65 and 66 respectively of housing 61 at the limits of axial travel of piston 62.

Fuel accumulator housing 61 is provided with ports 60, 67, 68 and 69. Duct port 67, which communicates with overflow duct 14a, is normally closed by piston 62 but may be uncovered by the piston 62 when it has travelled almost to the limit of its movement in the direction limited by abutment boss 64 against closure 66 thus allowing communication of duct 59 with duct 14a. Port 68, which is always open, is in communication with a source of high-pressure steam by way of duct 70. Port 69 is normally open but may be closed by piston 62 as it travels towards the closure 66. Ports 67 and 69 are so located and the length of piston 62 is such that port 69 is closed before port 67 is opened. Port 69 communicates with port 54 of shuttle-valve housing 37 by way of duct 71. A relatively small duct 72, forming a constricted passage for steam, constantly connects ducts 70 and 71 at a point in duct 71 between ports 69 and 54.

Referring to Figs. 2, 3, 4, 5 and 6, the construction and functioning or operation of the system may be understood.

Figure 2:
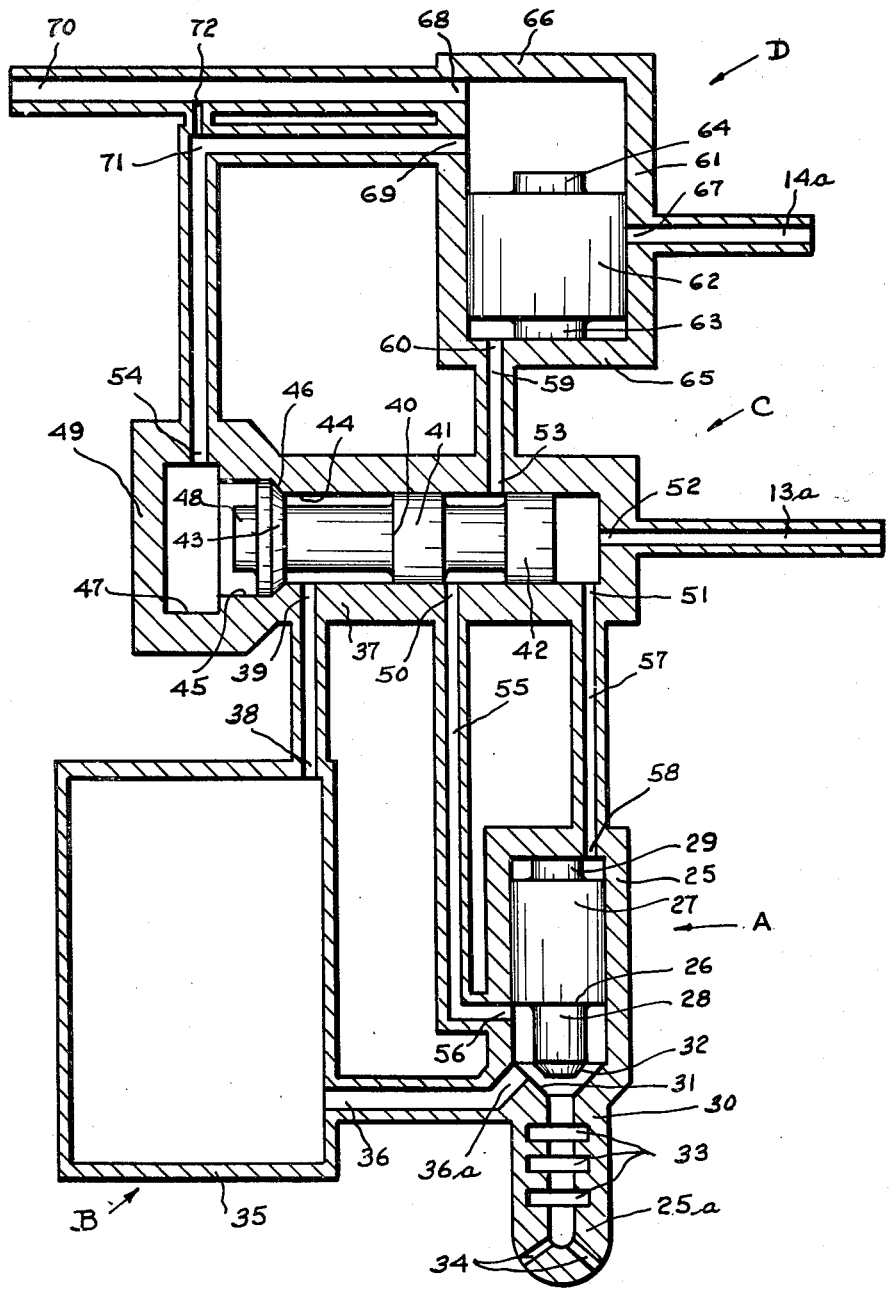
Fig. 2 is a diagrammatic view showing a fuel injection system constructed according to my invention at one point in its operation.

Fig. 2 shows valves 26 and 40 and piston 62 in the positions they assume at the end of an injection during regular cyclical operation on a running engine. Steam pressure from accumulator 35, by way of duct 36 and port 36a, has forced injection valve 26 to the limit of travel permitted by abutment of boss 29 against the closure or abutment of housing 25, and valve-face 32 on valve extension 28 is clear of seating 31. Steam pressure has forced mushroom head 43 of valve 40 into contact with seat 46. Steam pressure has forced piston 62 to the limit of travel permitted by abutment of boss 63 against closure 65 and fuel has been pumped by way of port 60, duct 59, bore 44, port 50, duct 55 and port 56 to nozzle 25a. Displacement of fuel by guide portion 27 of injection valve 26, also by land 42 of shuttle valve 40, has been accommodated by backflow along duct 13a as permitted by the fuel pump at the end of its delivery phase.

Figure 3:
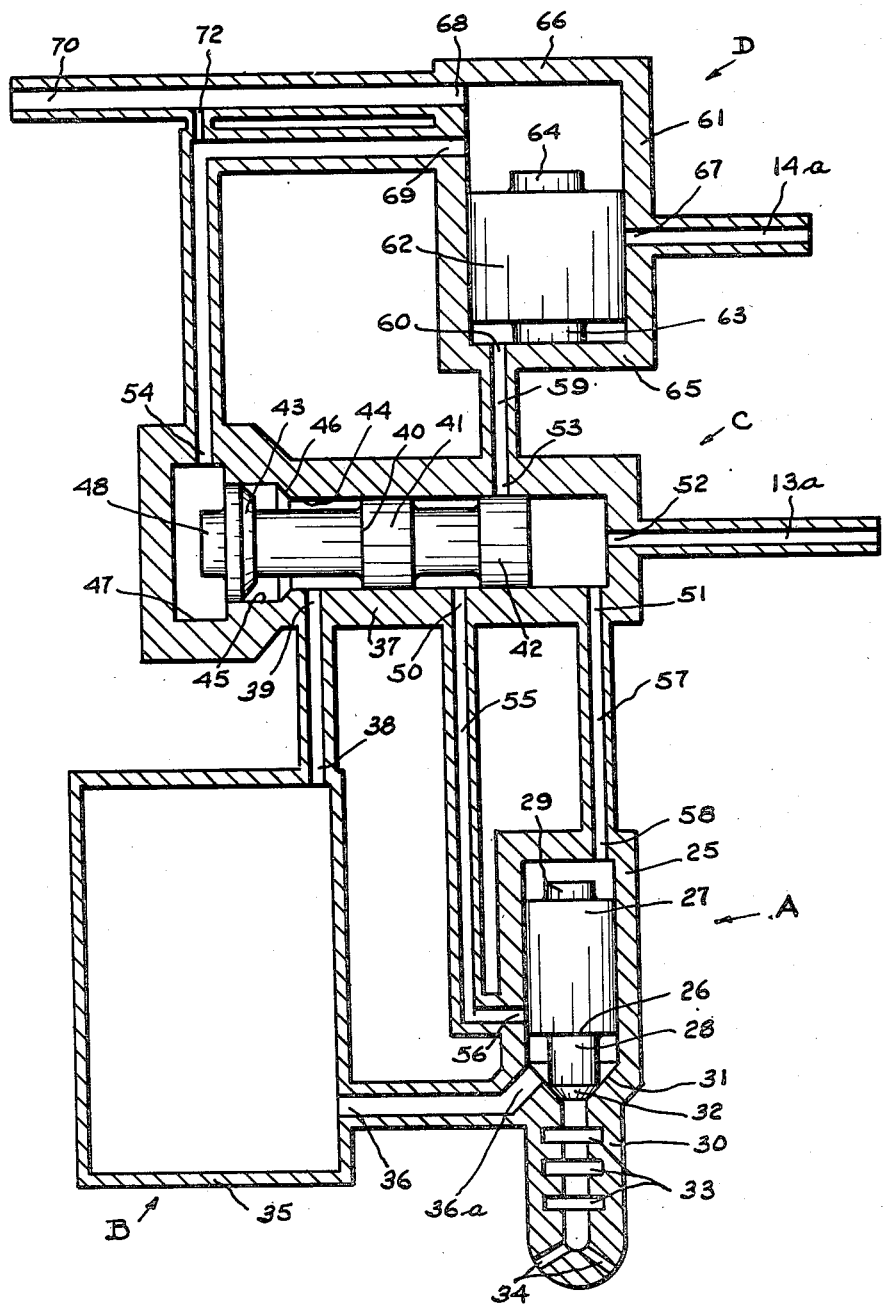

Fig. 3 shows valves 26 and 40 and piston 62 in the positions they assume when the fuel pump has commenced delivery of the next charge of fuel. Injection valve 26 has been forced by fuel pressure, communicated to guide portion 27 through duct 13a, port 52, bore 44, port 51, duct 57 and port 58, to the limit of travel resulting from abutment of valve-face 32 of valve extension 28 against seating 31. In this position of the injection valve 26 the port 56 is closed by guide-portion 27. Shuttle valve 40 is being forced by fuel pressure, communicated to land 42 through duct 13a and port 52, in the direction which unseats the mushroom head 43 from the seating 46. Fuel pressure must be greater than steam pressure since the area of the mushroom head 43 is greater than bore 44 in which land 42 is sliding. Piston 62 is still held by steam pressure in the position as in Fig. 2.

Figure 4:
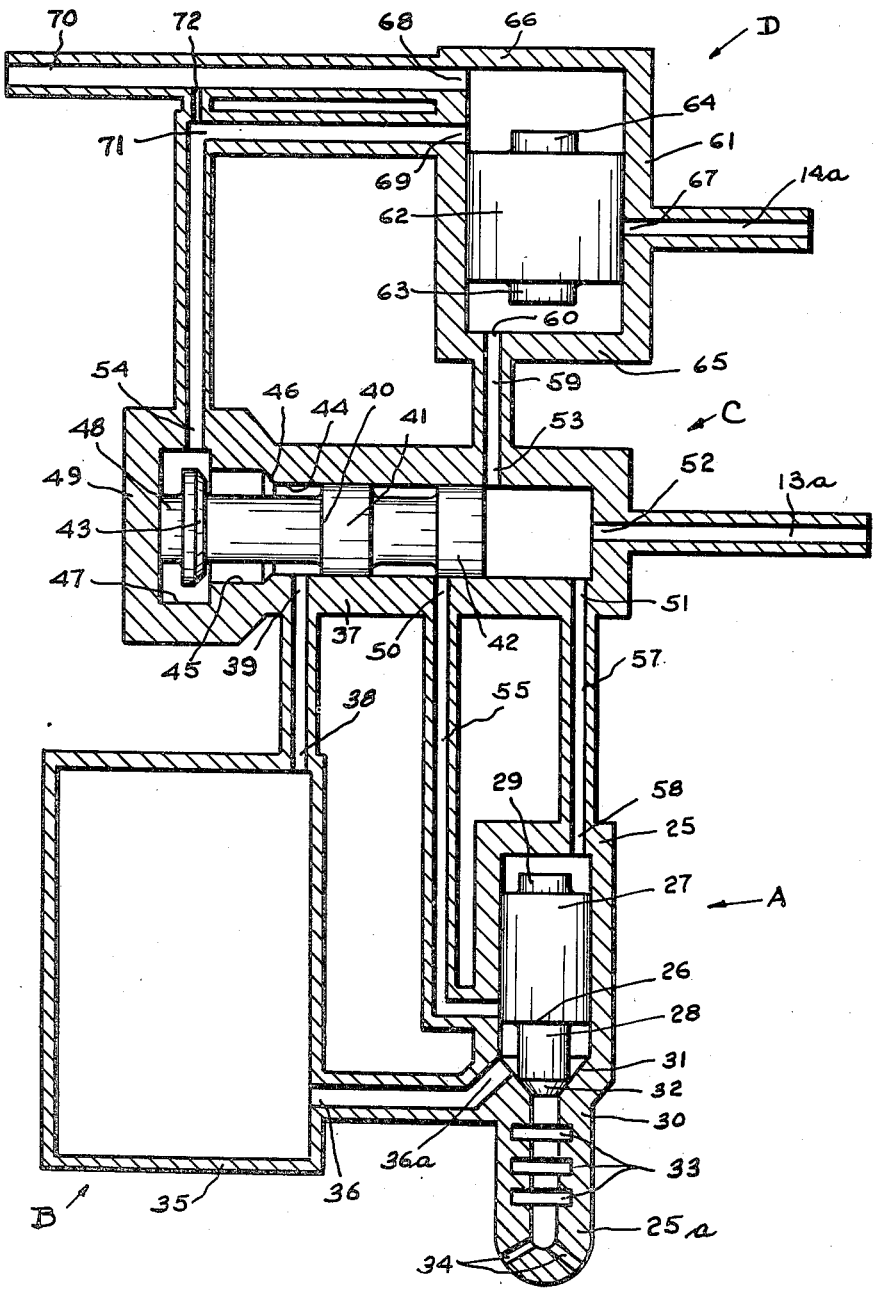

Fig. 4 shows valves 26 and 40 and piston 62 in the positions they assume later in the delivery stroke of the fuel pump. Injection valve 26 is still forced into the position shown in Fig. 3. Shuttle valve 40 has been forced to the limit of travel as permitted by abutment of boss 48 against closure 49. The mushroom head 43 is now clear of counterbore 45 and high pressure steam is admitted to steam accumulator 35 by way of duct 70, ports 68 and 69, duct 71, port 54, counterbores 47 and 45, bore 44, port 39 and duct 38. With the shuttle valve 40 in this position, land 42 has passed port 53 and fuel has been forced into the fuel accumulator by way of duct 13a, port 52, bore 44, port 53, duct 59 and port 60. Piston 62 has been forced by fuel pressure, in excess of steam pressure, to move in the direction remote from closure 65. The distance travelled in this direction by the fuel accumulator piston 62 is determined by the volume of fuel delivered per stroke by the fuel pump. This is the situation just prior to the beginning of an injection through nozzle 25a.

Figure 5:
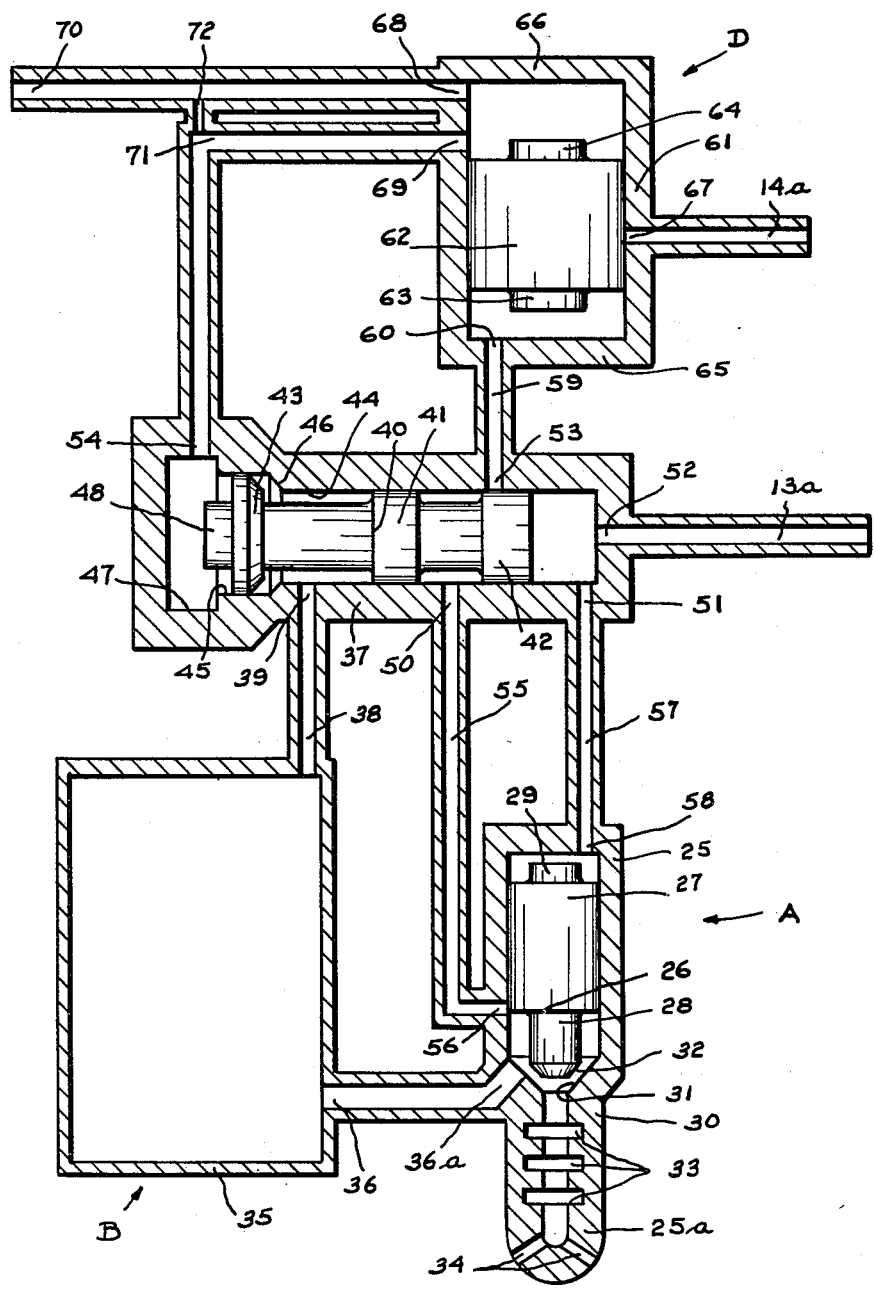

Fig. 5 shows valves 26 and 40 and piston 62 in the transient positions they assume during the initial stages of an injection, the fuel pump having completed its fuel delivery phase and having "unloaded" the duct 13a of pressure and left the way open for a reversal of fuel flow direction through this duct. Steam pressure acting on the differential area of the valve-face end of valve 26 causes the unseating of this valve from seat 31 since opposing fuel pressure acting on the opposite end of guide-portion 27 has been removed by the duct-unloading action of the fuel pump. Steam begins to issue from the nozzle 25a. Port 56 has been uncovered but no fuel issues therefrom as yet because land 42 of shuttle valve 40 has not yet uncovered port 53, but valve 40 is moving rapidly in the direction towards abutment of the mushroom head on seat 46 being forced by steam pressure on the large area of the mushroom head and having little opposing fuel pressure on land 42 to resist this motion.

Figure 6:
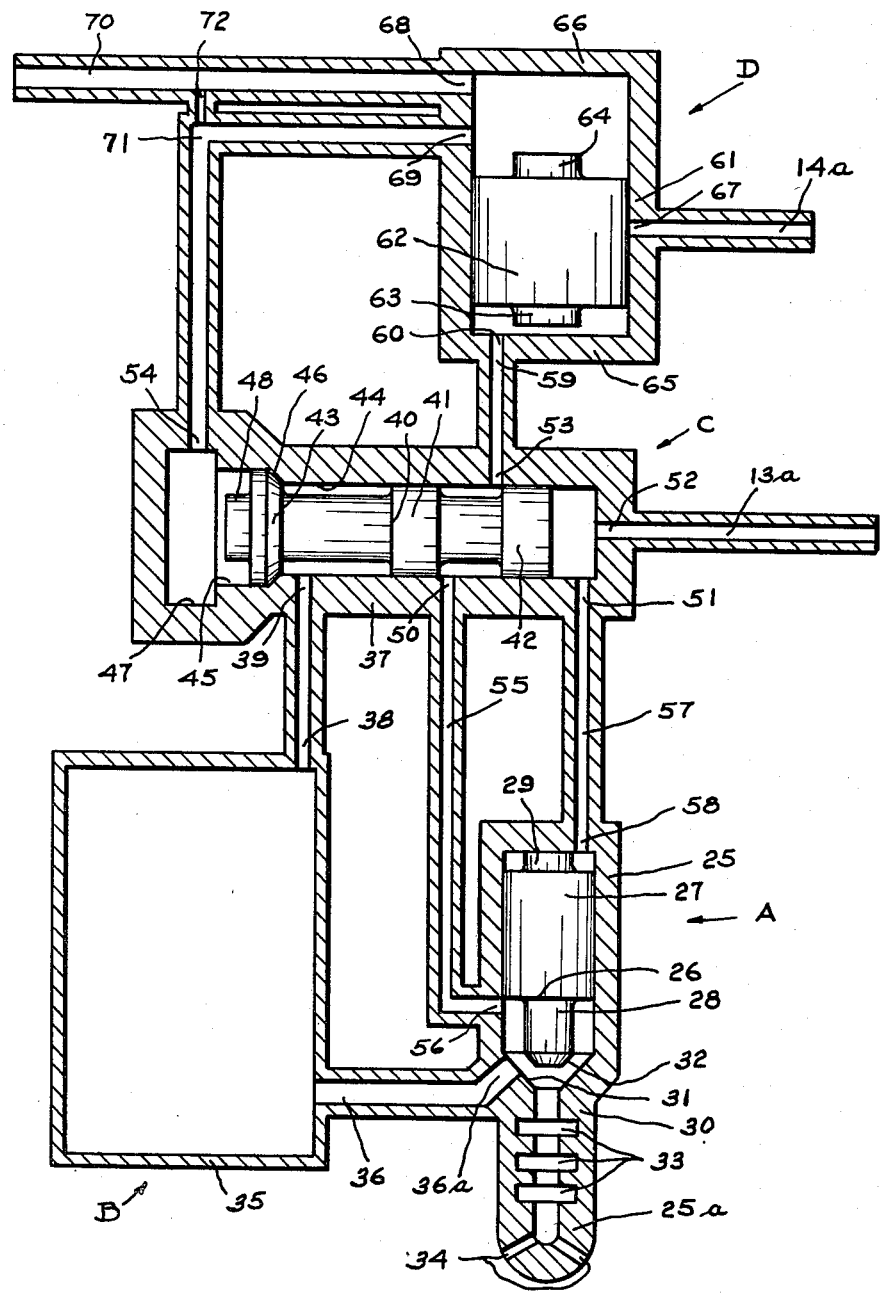

Fig. 6 shows valves 26 and 40 and piston 62 in the positions they assume during the mid-point of injection. Injection valve 26 has moved to the limit prescribed by abutment of boss 29 against the closure or abutment of housing 25 and port 56 is fully uncovered. Shuttle valve 40 has moved to the limit of travel when mushroom head 43 has seated on seat 46 and in this position port 53 has been fully uncovered by land 42. Piston 62 is being forced axially by steam pressure towards the limit where boss 63 abuts closure 65 and fuel is being pumped by piston 62 through port 60, duct 59, port 53, bore 44, port 50, duct 55, port 56 past seat 31, through nozzle 25a and out of orifices 34. At the same time steam which was accumulated in steam accumulator 35 is flowing through duct 36 and port 36a past seat 31 and mixing, under a state of high turbulence, in grooves 33, with the fuel and issues with the fuel through orifices 34. When piston 62 reaches the limit of its travel as shown in Fig. 2, injection is ended and the whole cycle repeats. All these moving parts of the injector assembly, injector valve 26, shuttle valve 40 and fuel accumulator piston 62, are normally thrust in one direction by steam pressure in excess of fuel pressure and in the other direction by fuel pressure in excess of steam pressure. Since the fuel injection pump is capable of delivering pressures greatly in excess of the maximum steam pressure, a seized element will cease movement when substantially at the limit of its travel in the direction in which it is thrust by excess of fuel pressure over steam pressure.

Figure 7:
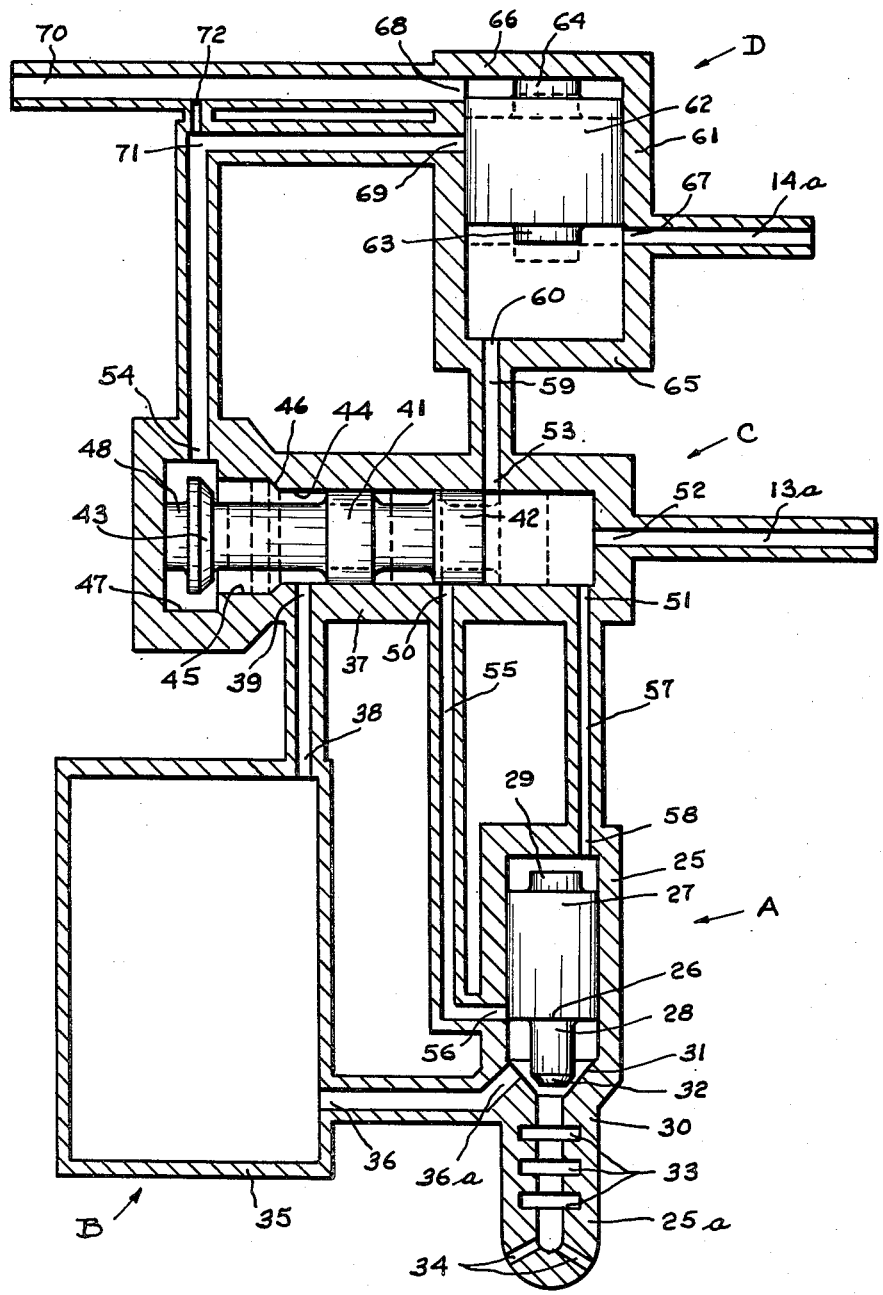

Fig. 7 illustrates the consequences of seizure of injector valve 26. The valve will eventually jam in the position where extension 28 is in contact, or nearly in contact, with seat 31; port 56 will be closed off by guide portion 27 of the valve and fuel will not be able to follow its prescribed normal path along ducts 59 and 55, and fuel accumulator piston 62 will not make a fuel delivery stroke. Successive charges of fuel entering duct 13a from the fuel injection pump will move piston 62 to that end of its travel where boss 64 makes, or nearly makes, contact with closure 66; further charges of fuel entering duct 13a will be rejected by way of duct 14a without giving rise to excessive stresses in the structure of the injector itself or of the fuel injection pump. Piston 62 will reciprocate slightly in response to incoming charges of fuel but will not move, in the direction due to steam pressure thrust, appreciably past the point where overflow port 67 is closed off; furthermore, during the whole of this restricted reciprocation of piston 62, port 69 will remain closed and steam can only reach the steam accumulator 35, and, if valve 26 is not completely seated, the nozzle 25a by way of the constricted passage 72. Shuttle valve 40 will continue to reciprocate but fuel will only flow in one direction, towards the fuel accumulator, through port 53 and there will be no flow through ports 50 or 51. With a seized injector valve, therefore, there will be no fuel passing through the nozzle, and only as much steam will escape as can pass through restricted passage 72.

Figure 8:
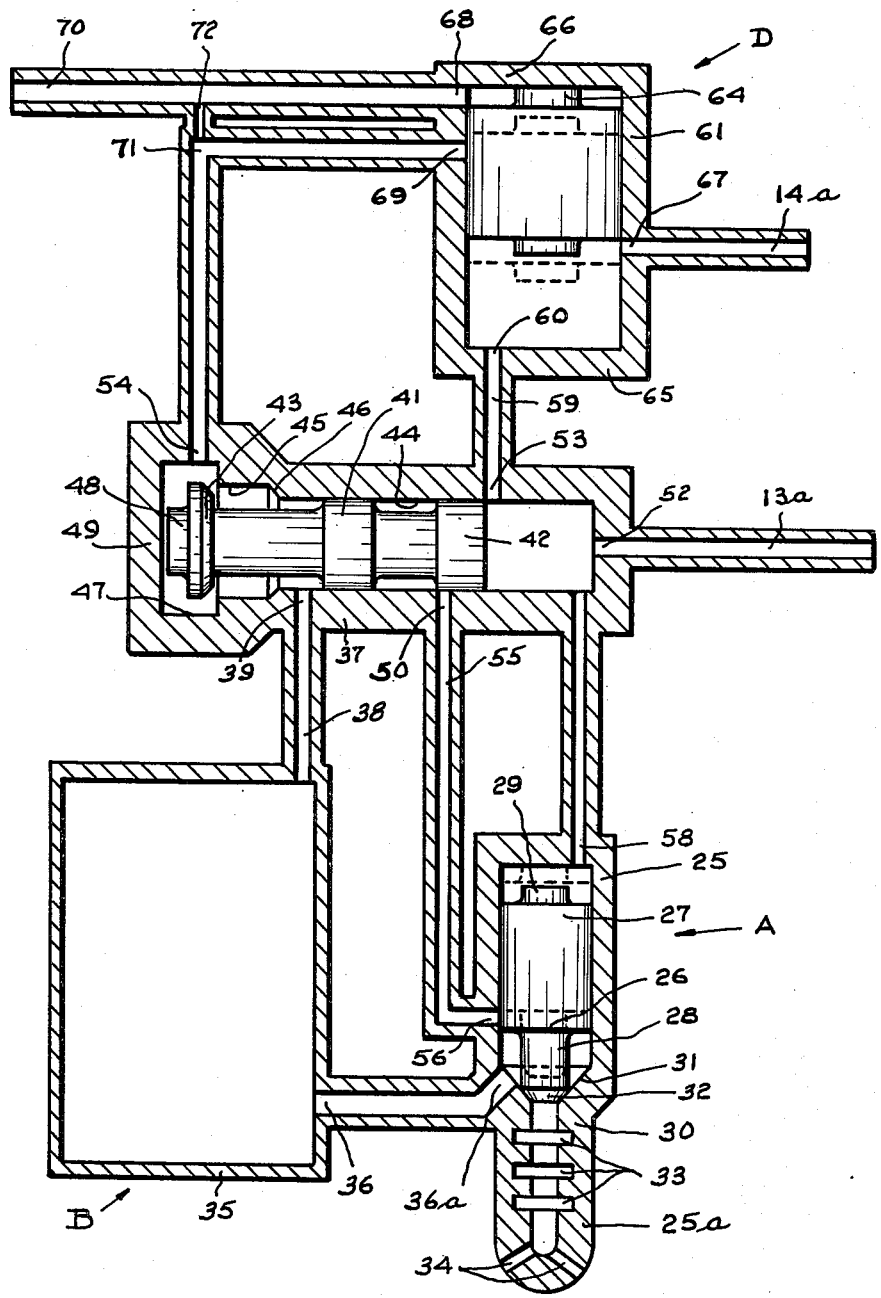

Fig. 8 illustrates the result of a seized shuttle valve 40, which will cease movement when in a position in which boss 48 is in contact, or nearly in contact, with closure 49. Port 50 will be closed off so that no fuel can pass along duct 55 to nozzle 25a. Successive charges of fuel entering duct 13a will thrust fuel accumulator piston to the point in its travel where it closes port 69 and uncovers overflow port 67. Piston 62, in response to successive fuel charges, will reciprocate with limited amplitude substantially as in the case of a seized injector valve shown in Fig. 7. Steam has access to steam accumulator 35 and nozzle 25a only by way of the restricted passage 72. Injector valve 26 will reciprocate throughout its normal range of motion and some steam will issue from the nozzle 25a in each cycle, but no fuel will be discharged through the nozzle 25a because port 50 is closed by land 42 of shuttle valve 40. There will be slightly greater amplitude of reciprocation of piston 62 than in the previous case owing to the active displacement of guide portion 27 of injector valve 26.

Figure 9:
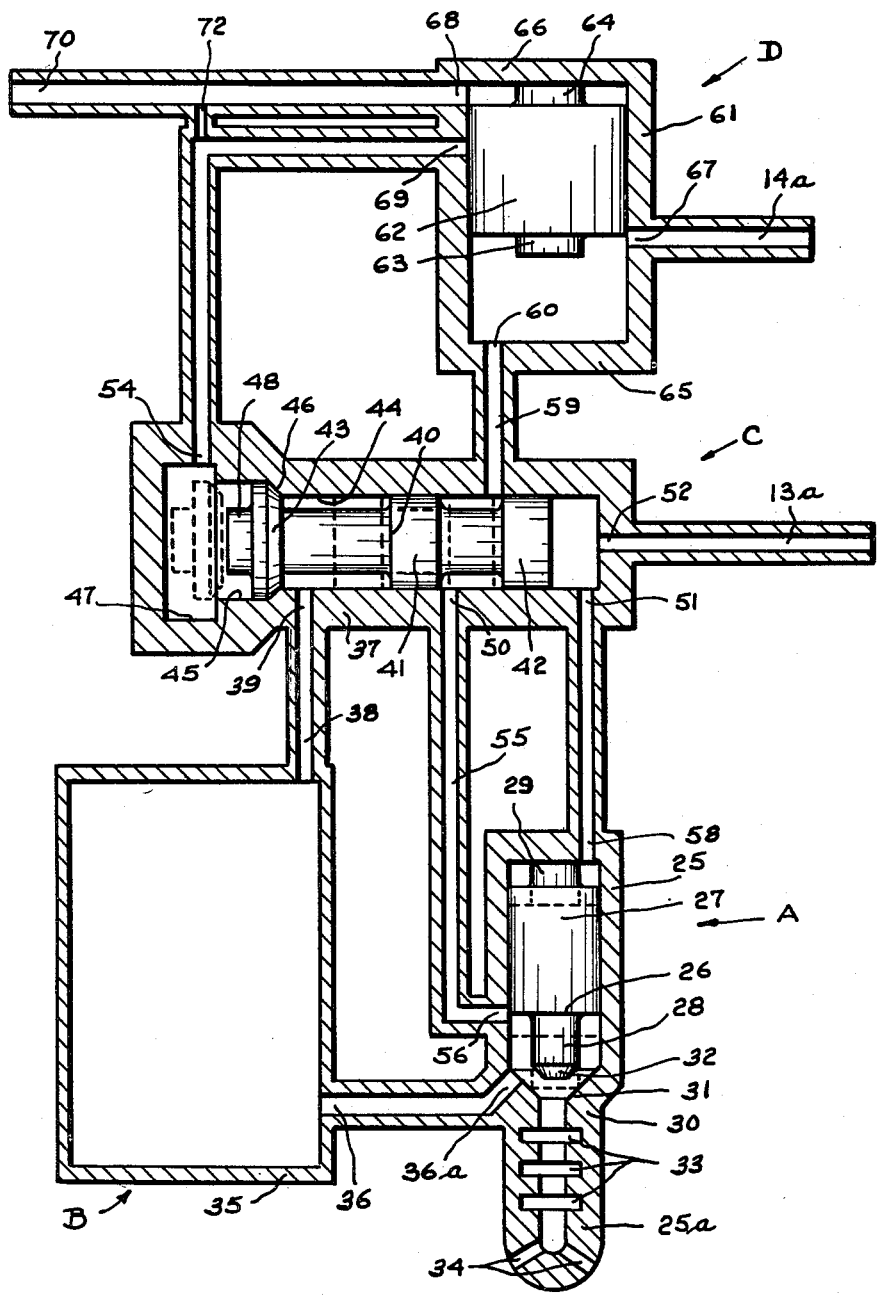

Fig. 9 shows seizure of fuel accumulator piston 62 which will come to rest with boss 64 touching, or nearly touching, closure 66. Port 67 will be partially or fully open and port 69 will be closed. Shuttle valve 40 and injector valve 26 will reciprocate throughout their normal operating ranges of motion. Since piston 62 does not make a delivery stroke, no fuel will issue from nozzle 25a and the only steam which can pass through the nozzle is that which finds its way through constricted passage 72. Charges of fuel entering duct 13a from the fuel injection pump will escape by way of overflow port 67 without giving rise to abnormal stresses in the injector structure or the fuel injection pump or its operating mechanisms.

Figure 10:
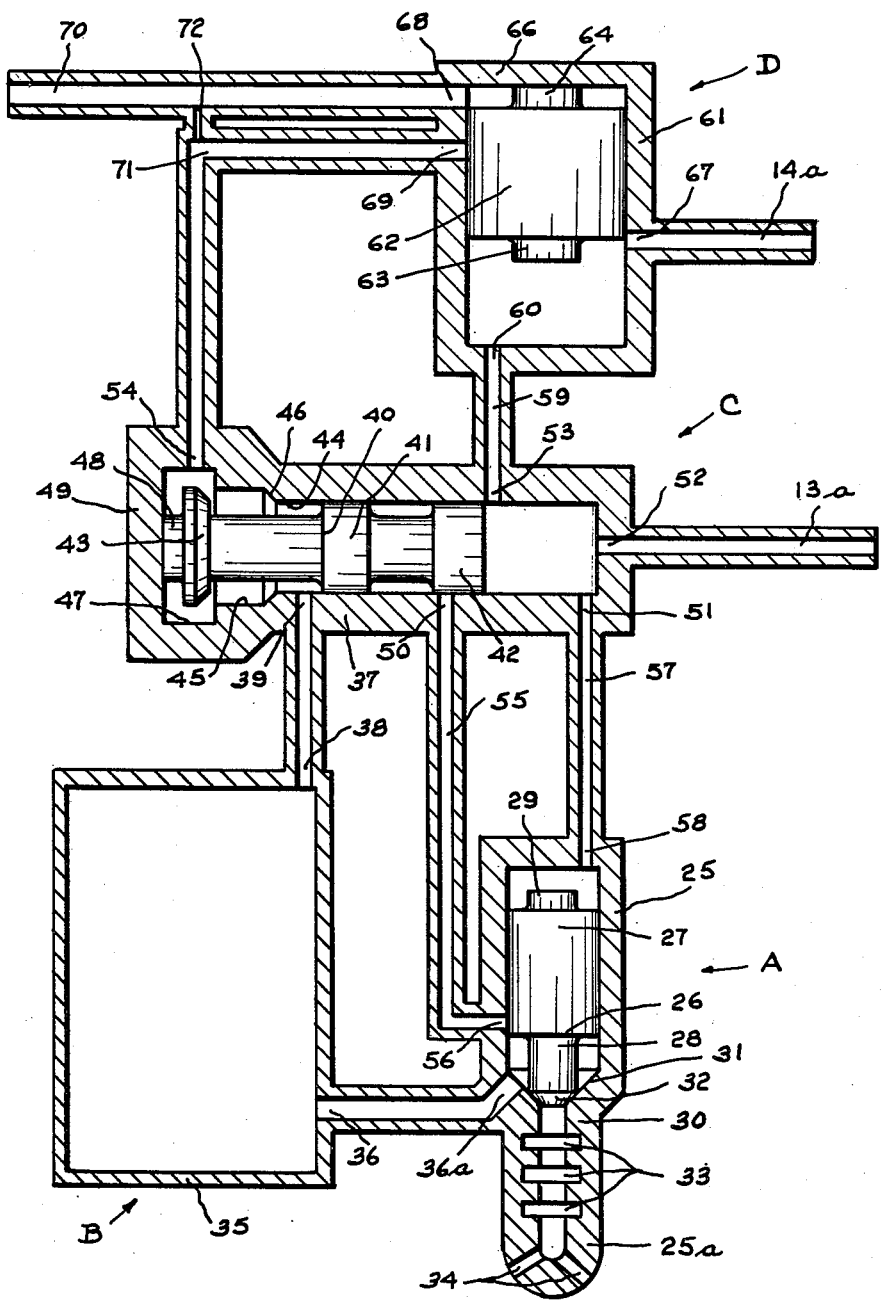

Fig. 10 represents the case where there is no steam supply to an injector assembly but the engine is turning and the fuel injection pump is delivering charges of fuel in the normal manner. Such a condition might arise out of an attempt to start the engine without first providing a head of steam from the flash boiler, or the water supply to the boiler feed pump might fail while the engine is running; in any event it is undesirable to "flood" the engine cylinders with fuel which has not been injected in the form of a spray since fuel so introduced will not burn properly and may foul the engine.

When there is no steam pressure in duct 70, fuel entering duct 13a will thrust shuttle valve 40 to the limit of its travel at which boss 48 abuts closure 49 and injector valve 25a will move to the limit of travel where it seats on seat 31. Fuel accumulator piston 62 will move to the limit where boss 64 makes contact with closure 66 and no further movements of these three components will take place until steam pressure is established in duct 70.

All fuel entering duct 13a will pass out of the injector assembly through overflow port 67. Establishment of steam pressure in duct 70 will give rise to steam flow through restricted duct 72 and this will cause the shuttle valve to move to the other end of its travel between delivery strokes of the fuel injection pump, when fuel pressure in duct 13a is relieved, and fuel accumulator piston 62 will be enabled to force fuel, by way of ducts 59 and 55 to nozzle 25a; port 69 will then be uncovered; port 67 will be closed and normal functioning of the system will be reestablished.

The purpose of duct 72 is to permit this reestablishment of normal functioning if, for any cause, the moving parts of the injector assembly should come to rest in the combination of positions as shown in Fig. 10—which would happen if any engine operator shut the steam supply off before stopping the engine; it might also occur if the engine were left standing without operation for a period of time with some residual pressure, such as gravity head, of fuel in duct 13a.

In Figs. 11 to 16 inclusive there is shown the preferred form of execution of the invention, which form is believed to be relatively simple and economical in construction and efficient in operation.

In this form of invention the parts thereof corresponding to those shown in the diagrammatic drawings have been correspondingly numbered so far as practicable for convenience in referring to those views of the drawings.

In the preferred form there is provided a tapered housing 73 having an opening and adapted to be closed by the cap or cover 74 which is retained in position on the housing 73 by means of the screws 75 and said cap or cover 74 is adapted to be sealed by the gasket 76.

Within the housing 73 is positioned a member 77 which has its outer surface formed so as to correspond with the inner surface of the housing 73 and so as to closely engage the same when the member 77 is placed within said housing.

The member 77 has the threaded extension 78 to which is connected the nozzle 25a adapted to receive fuel through the duct 79 and having a turbulence promoting arrangement corresponding to that numbered 33 in the diagrammatic drawings and which arrangement is formed by the alternate washers 80 which have alternating sized central apertures 81 and 82 as shown.

The member 77 has a central bore beginning with the bore 79, previously described, and progressively increasing in cross section from said bore 79 to the opposite end of said member 77 which arrangement facilitates the manufacturing and assembly of the device.

In this form of the invention the ducts for fuel and steam are preferably formed in the outer surface of the member 77 as shown although they could be formed on the inner surface of the casing 73 if desired and said ducts are provided with the necessary ports for communicating with the central bore or aperture.

In this form of the invention the fuel accumulator valve 62 works in the opposite direction to that shown in the diagrammatic drawings and as will be seen, the closures 65 and 66 are on the reverse sides of said accumulator piston 62 from that shown in the diagrammatic drawings such as Fig. 2.

In this form of the invention the steam accumulator 35 is positioned adjacent the upper end of the casing 73.

The closure member 65 is provided with the reduced extension 83 which fits within the opening in the member 84 and is locked in position by the socket head set screws 85 and 86 which are threaded into the opening in the member 84 and the whole assembly is retained in operative position within the casing 73 by means of the spring ring 87 which is inserted into a slot 88 in the inner periphery of the housing 73 and engages the upper surfaces of the member 84.

In this form of the invention, as will be seen from Fig. 12, the constricted opening 72 is formed by forming the disc closure 49 with the constricted opening 72 and locking said closure 49 in position by means of the threaded closure member 66 which has a plurality of openings therein adapted to communicate with said constricted opening 72.

The transverse slot 89 is provided in the member 77 between the valve 26 and the shuttle valve 40 and in this slot is positioned the member 90 which is in the form of a narrow abutment having openings on the opposite sides thereof and which abutment serves to act as a stop for the valve 27 but allows communication with the shuttle valve 40 in the manner similar to the port 58 and duct 57 as shown in the diagrammatic views.

It is pointed out that by employing the tapered housing 73 with the tapered insert or member 77 and also by the use of the central bore or orifice having areas progressively increasing in size from the bore 79 to the opposite end of the member 77, that the manufacture of the members with the precision required for properly constricting the same is greatly facilitated.

In operation of the engine using this injection system, a normal governor causes fuel injection pump 13 to deliver fuel to injector 14 in accordance with the requirements of the engine and steam is supplied to the injector 14 by flash boiler 3. Should the engine exhaust not provide sufficient heat to maintain the desired steam temperature, the temperature-sensitive element 4 will cause bellows 5 to move the control lever of burner 6 in a direction to feed a spray of fuel and air into the flash boiler 3 and at the same time igniter-plug 16 will be energized so as to light the burner in the event that the exhaust heat in the system is insufficient to promote ignition. Should the steam pressure fall below the prescribed minimum, the spring in pressure-responsive element 11 will overcome the piston force and will cause the control rod of boiler feed pump 7 to move in a direction to increase the rate of water feed to flash boiler 3.

Burner 6 and igniter plug 16 are also used for the purpose of generating the necessary head of steam for injection when starting the engine, at which time no exhaust heat is available. When the running engine provides adequate exhaust heat for generation of steam at the required pressure and temperature, element 4 in cooperation with device 5 will shut off burner 6 and igniter plug 16.

By the use of the method and apparatus of the present invention, it is possible to obtain a desired degree of dispersion and penetration of fuel particles into the combustion chamber of the engine with materially lower pressures than are necessary to secure the same result with presently employed apparatus. The pumping of liquids containing suspended solid particles has previously resulted in serious erosion of the fuel injection equipment if the pressures are high such as 5000 pounds per square inch and higher, whereas with pressures of 3000 pounds per square inch or lower the abrasive effect of the solid particles is inconsiderable. The pressures contemplated with the present invention are a maximum of 1500 pounds per square inch.

One typical example of pressures which may be employed are, steam pressure of 1000 pounds per square inch, fuel peak pressure approximately 1200 pounds per square inch, maximum combustion pressure in the engine approximately 800 pounds per square inch.

The method and apparatus of the present invention may be employed with compression ignition engines and spark ignition engines with the same advantages.

Superheated steam is employed in order that, where a liquid fuel is employed, the fuel will be evaporated by the superheated steam as it enters the combustion chamber of the engine, and where a suspension of solid fuel particles in a liquid vehicle is employed, the superheated steam will evaporate the liquid vehicle so that the solid particles of fuel may be in a dry state when introduced to the air in the engine combustion chamber. Also, the use of steam tends to reduce ignition lag.

From the foregoing it will be seen that I have provided simple, efficient and economical means for obtaining all of the objects and advantages of the invention.

I claim:

1. The method of injecting fuel by a vapor blast through a nozzle into the combustion chamber of an internal combustion engine comprising injecting said fuel in successive charges with the injection of each fuel charge being rapid and of short duration and the successive injections being separated from each other by time intervals of relatively long duration, metering a separate charge of blast vapor for each injection of fuel by filling a vapor accumulator in the time intervaled by the successive fuel injections, retaining each blast vapor charge in the vapor accumulator until the blast vapor charge is required for the injection of a fuel charge, metering a separate charge of fuel from a pulsating means for each injection in the time interval between injections, delivering the fuel charge to a fuel accumulator, retaining each fuel charge in the fuel accumulator until the fuel charge is to be injected and employing a pressure-drop in the fuel duct between the pulsating means and the fuel accumulator to release the stored blast vapor charge from the vapor accumulator and directing it to the nozzle and releasing the stored fuel charge from the fuel accumulator and directing said fuel charge to the nozzle and permitting initial release of blast vapor ahead of the release of fuel.

2. The method of injecting fuel by a vapor blast through a nozzle into the combustion chamber of an internal combustion engine comprising injecting said fuel in successive charges with the injection of each fuel charge being rapid and of short duration and the successive injections being separated from each other by time intervals of relatively long duration, metering a separate charge of blast vapor for each injection of fuel by filling a vapor accumulator in the time intervaled by the successive fuel injections, retaining each blast vapor charge in the vapor accumulator until the blast vapor charge is required for the injection of a fuel charge, metering a separate charge of fuel from a pulsating means for each injection in the time interval between injections, delivering the fuel charge to a fuel accumulator, retaining each fuel charge in the fuel accumulator until the fuel charge is to be injected and employing a pressure-drop in the fuel duct between the pulsating means and the fuel accumulator to release the stored blast vapor charge from the vapor accumulator and directing it to the nozzle and releasing stored fuel charge from the fuel accumulator and directing said fuel charge to the nozzle and permitting initial release of blast vapor ahead of the release of fuel and completely expelling the fuel charge from the fuel accumulator before the blast vapor charge has been completely discharged from the vapor accumulator.

3. The method of injecting fluid fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a vapor accumulator, retaining the blast vapor charge in the vapor accumulator until said charge is required for the injection of a fuel charge, metering a separate charge of fuel from a pulsating means for each injection, delivering the fuel charge to a fuel accumulator, retaining the fuel charge in said fuel accumulator until the fuel charge is to be injected and employing a pressure-drop in the fuel duct between the pulsating means and said fuel accumulator for releasing the stored blast vapor charge from the vapor accumulator and directing it to the nozzle and also for releasing the fuel charge from the fuel accumulator and directing said fuel charge to the nozzle.

4. The method of injecting fuel by a vapor blast through a nozzle into the combustion chamber of an internal combustion engine comprising injecting said fuel in successive charges with the injection of each fuel charge being rapid and of short duration and the successive injections being separated from each other by time intervals of relatively long duration, metering a separate charge of blast vapor for each injection of fuel by filling a fixed-volume vapor accumulator in the time intervaled by the successive fuel injections, retaining each blast vapor charge in the vapor accumulator until the blast vapor charge is required for the injection of a fuel charge, metering a separate charge of fuel from a pulsating means for each injection in the time interval between injections, delivering the fuel charge to a variable-volume fuel accumulator, retaining each fuel charge in the fuel accumulator until the fuel charge is to be injected and employing a pressure-drop in the fuel duct between the pulsating means and the fuel accumulator to actuate valve means for releasing the stored blast vapor charge from the vapor accumulator and directing it to the nozzle with said valve means also releasing the fuel charge from the fuel accumulator and directing said fuel charge to the nozzle and permitting initial release of blast vapor ahead of the release of fuel.

5. The method of injecting fuel by a vapor blast through a nozzle into the combustion chamber of an internal combustion engine comprising injecting said fuel in successive charges with the injection of each fuel charge being rapid and of short duration and the successive injections being separated from each other by time intervals of relatively long duration, metering a separate charge of blast vapor for each injection of fuel by filling a fixed-volume vapor accumulator in the time intervaled by the successive fuel injections, retaining each blast vapor charge in the vapor accumulator until the blast vapor charge is required for the injection of a fuel charge, metering a separate charge of fuel from a pulsating means for each injection in the time interval between injections, delivering the fuel charge to a variable-volume fuel accumulator, retaining each fuel charge in the fuel accumulator until the fuel charge is to be injected and employing a pressure-drop in the fuel duct between the pulsating means and the fuel accumulator to actuate valve means for releasing the stored blast vapor charge from the vapor accumulator and directing it to the nozzle with said valve means also releasing the fuel charge from the fuel accumulator and directing said fuel charge to the nozzle and permitting initial release of blast vapor ahead of the release of fuel and completely expelling the fuel charge from the fuel accumulator before the blast vapor charge has been completely discharged from the vapor accumulator.

6. The method of injecting fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a fixed-volume vapor accumulator, retaining each blast vapor charge in the vapor accumulator until said charge is required for the injection of a fuel charge, metering a separate charge of fuel for each injection by means of a pulsating metering pump, delivering the fuel charge to a variable-volume fuel accumulator, retaining each fuel charge in said fuel accumulator until the fuel charge is to be injected and employing a pressure-drop in the fuel duct between the metering pump and said fuel accumulator for releasing the stored blast vapor charge from the vapor accumulator and directing it to the nozzle and also for releasing the fuel charge from the fuel accumulator and directing said fuel charge to the nozzle.

7. The method of injecting fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a fixed-volume vapor accumulator, retaining each blast vapor charge in the vapor accumulator until said charge is required for the injection of a fuel charge, metering a separate charge of fuel for each injection by means of a pulsating metering pump, delivering the fuel charge to a variable-volume fuel accumulator, retaining each fuel charge in said fuel accumulator until the fuel charge is to be injected and employing a pressure-drop in the fuel duct between the metering pump and said fuel accumulator for releasing the stored blast vapor charge from the vapor accumulator and directing it to the nozzle and also for releasing the fuel charge from the fuel accumulator and directing said fuel charge to the nozzle and permitting initial release of blast vapor ahead of the release of said fuel charge.

8. The method of injecting fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a vapor accumulator, retaining each blast vapor charge in the vapor accumulator until said charge is required for the injection of a fuel charge, metering a separate charge of fuel for each injection by means of a pulsating metering pump, delivering the fuel charge to a fuel accumulator, retaining each fuel charge in said fuel accumulator until the fuel charge is to be injected and employing a pressure-drop in the fuel duct between the metering pump and said fuel accumulator for releasing the stored blast vapor charge from the vapor accumulator and directing it to the nozzle and also for releasing the fuel charge from the fuel accumulator and directing said fuel charge to the nozzle and permitting initial release of blast vapor ahead of the release of said fuel charge.

9. The method of injecting fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a vapor accumulator, retaining each blast vapor charge in the vapor accumulator until said charge is required for the injection of a fuel charge, metering a separate charge of fuel for each injection by means of a pulsating metering pump, delivering the fuel charge to a variable-volume fuel accumulator, retaining each fuel charge in said fuel accumulator until the fuel charge is to be injected and employing a pressure-drop in the fuel duct between the metering pump and said fuel accumulator for releasing the stored blast vapor charge from the vapor accumulator and directing it to the nozzle and also for releasing the fuel charge from the fuel accumulator and directing said fuel charge to the nozzle, and completely expelling the fuel charge from the fuel accumulator before the blast vapor charge has discharged itself completely from the vapor accumulator.

10. The method of injecting fuel by vapor blast through a nozzle into the combustion chamber of an internal combustion engine in successive, rapid injections of short duration which successive injections are separated from each other by time intervals of relatively long duration comprising metering a separate charge of blast vapor for each injection in a vapor accumulator, retaining each blast vapor charge in the vapor accumulator until said charge is required for the injection of a fuel charge, metering a separate charge of fuel for each injection by means of a pulsating metering pump, delivering the fuel charge to a variable-volume fuel accumulator, retaining each fuel charge in said fuel accumulator until the fuel charge is to be injected and employing a pressure-drop in the fuel duct between the metering pump and said fuel accumulator for releasing the stored blast vapor charge from the vapor accumulator and directing it to the nozzle and also for releasing the fuel charge from the fuel accumulator and directing said fuel charge to the nozzle and permitting initial release of blast vapor ahead of the release of said fuel charge and completely expelling the fuel charge from the fuel accumulator before the blast vapor charge has discharged itself completely from the vapor accumulator.

11. The method of injecting fuel by a vapor blast through a nozzle into the combustion chamber of an internal combustion engine comprising injecting said fuel in successive charges with the injection of each fuel charge being rapid and of short duration and the successive injections being separated from each other by time intervals of relatively long duration, metering a separate charge of blast vapor for each injection of fuel by filling a vapor accumulator in the time intervaled by the successive fuel injections, retaining each blast vapor charge in the vapor accumulator until the blast vapor charge is required for the injection of a fuel charge, metering a separate charge of fuel from a pulsating means for each injection in the time interval between injections, delivering the fuel charge to a fuel accumulator, retaining each fuel charge in the fuel accumulator until the fuel charge is to be injected and employing a pressure-drop in the fuel duct between the pulsating means and the fuel accumulator to release the stored blast vapor charge from the vapor accumulator and directing it to the nozzle and releasing the stored fuel charge from the fuel accumulator and directing said fuel charge to the nozzle.

MARTIN J. BERLYN.

REFERENCES CITED

The following references are of record in the file of this patent:

UNITED STATES PATENTS

| Number | Name | Date |
|---|---|---|
| 510,673 | Bryce | Dec. 12, 1893 |
| 816,314 | Griffen | Mar. 27, 1906 |
| 1,329,967 | Greenstreet | Feb. 3, 1920 |
| 1,432,071 | Lockett | Oct. 17, 1922 |
| 1,500,880 | Morgan | July 8, 1924 |
| 1,810,768 | Holzwarth | June 16, 1931 |
| 1,976,528 | Vandeveer | Oct. 9, 1934 |
| 2,312,055 | Smith | Feb. 23, 1943 |
| 2,319,591 | Ferguson | May 18, 1943 |
| 2,336,538 | Geisel | Dec. 14, 1943 |
| 2,555,082 | Goddard | May 29, 1951 |